Jan. 11, 1966  E. F. PULS ETAL  3,228,261

LOAD SHIFTING DEVICE FOR PLANETARY GROUP GEARINGS

Filed Oct. 26, 1962  3 Sheets-Sheet 1

Inventors

Erich Friedrich Puls, Wolfgang Puls + Jurgen Puls

Attorney John J. Hart

United States Patent Office 3,228,261
Patented Jan. 11, 1966

3,228,261
LOAD SHIFTING DEVICE FOR PLANETARY GROUP GEARINGS
Erich Friedrich Puls, Wolfgang Puls, and Jürgen Puls, all of Leopoldstrasse 1, Karlsruhe, Germany; Gertrud Puls, nee Schröter, executrix and trustee of said Erich Friedrich Puls, deceased
Filed Oct. 26, 1962, Ser. No. 233,225
Claims priority, application Germany, Oct. 30, 1961, P 28,121
14 Claims. (Cl. 74—770)

The present invention relates to a load shifting device for planetary group gearings with gearing groups connected in series one behind the other and having stepped-down speeds which can be connected by the locking of their reaction parts by means of friction clutches.

Planetary group gearings are known in various embodiments. Each gearing group has a direct drive in which the reaction part moves, and a stepped-down speed in which its reaction part is held fast to the housing. Two such gearing groups give, for instance, four speeds, while in the case of three gearing groups eight speeds can be obtained on the common secondary shaft. The reaction part in such gearing group is considered as that gearing part of each gearing group which is neutral, i.e., with the secondary shaft stationary, carries out a rearward movement of rotation, is stationary in the stepped-down speed, and rotates in direct drive at the speed of rotation of the drive shaft of said gearing group. The torques on the reaction parts are produced in an automotive gearing by the tractive force with which the driving motor drives the vehicle, or from the pushing force when the drive proceeds from the vehicle under the influence of the weight of the vehicle.

The known planetary group gearings are connected by friction clutches which act on the reaction parts. Up to now, there have been used in this connection two coupling elements which consisted either of a brake band and a disc clutch, or two disc clutches.

The manner of cooperation of the band brake and overriding clutch is decisive for the change of torque and speed on the drive shaft occurring upon the change in gear. With strongly varying loads, for instance, in an automobile gearing, it is practically impossible to control the alternate connecting of the band brake and the disconnecting of the disc clutch (or of two disc clutches) in such a precise manner that the transmission of the power is not disturbed or interrupted. Known planetary group gearings were therefore connected with a converter or a hydraulic clutch thus taking up the torque peaks which occur in case of a nonuniform or interrupted transmission of power in the gearing. Such measures, however, result in a considerable increase in the number of parts and cause a substantial increase in the cost of the entire drive. Furthermore, they result in an impairment in the efficiency of the transmission.

The object of the present invention is to develop multiple-speed planetary group gearings as load shifting gearings in which connection the change of gears takes place in upward direction without any interruption in the tractive force, and the change in torque at the driven shaft takes place continuously. In accordance with the present invention, in the case of planetary group gearings of the type indicated, it is proposed that the rotatable reaction part of each gearing group be capable of coupling with three, rather than two as previously, separate clutch devices, namely an overriding friction clutch for direct drive, a freewheel gripping brake for the pulling-force direction of movement or driving of the stepped-down gear, and a friction brake for the pushing-force direction of movement of the stepped-down gear when the latter is driven by the vehicle. The development of these clutching devices is of decisive importance for favorable cooperation in accordance with the invention. Only in the case of smaller embodiments will a friction band brake meet the requirements established. For larger gearings the band brake is advisedly replaced by a multiple-plate friction brake which as a disc brake has a considerably larger frictional surface and therefore can be loaded more than a band brake of the same width and same diameter. For the freewheel gripping lock, one of the known grip-roller constructions can also be used only in case of small gears with low speeds of rotation. Gearings of high speeds of rotation and high forces of inertia do not permit the use of grip roller freewheels, since upon the gripping by a grip roller freewheel a jolt torque occurs which may be two to three times greater than the corresponding normal torque. This jolt torque in the present case is further increased by the mass of the reaction part. Furthermore, there is a transmission of force via line contact by means of Hertzian pressing.

A particularly advantageous embodiment for high loads is therefore obtained, in accordance with a further development of the invention, in that the overriding friction clutch for the direct drive is a connectible and disconnectible multiple-plate friction clutch and the freewheel gripping lock for the driving direction of the stepped-down gear is a gripping-jaw ratchet controlled by the speed of rotation of its reaction part and in that the friction brake for the driven direction of the stepped-down gear consists of a connectible and disconnectible multiple-plate friction brake.

One suitable arrangement in accordance with the invention embodies a freewheeling gripping lock which is so developed that the gripping jaws are pivoted to gripping levers swingably supported on bolts distributed along the circumference of the rotatable reaction part, said gripping jaws when the reaction part is rotating being subjected by spring elements to a moment of spring force pressing against the gripping jaws and to a moment of centrifugal force which lifts the gripping jaws, the gripping jaws being pressed, when the spring-force moment predominates, in the locking direction against a stationary inner brake drum with an angle of application, the tangent of which corresponds to the minimum coefficient of friction for self-locking between the gripping jaws and inner brake drum. In this way, there is produced on the gripping jaws a frictional force which makes it certain that at the moment of the stopping of the reaction part, the moment of reaction passes smoothly from the reaction part to the outer gearing housing and is supported by the latter.

It may furthermore be advisable so to select the arrangement of the individual parts that on every two adjacent gripping jaws there acts a tension spring the points of attack of which on the gripping jaw form different active lever lengths and in this connection so determine the spring force that, during the delay of the reaction part beginning at a given speed of rotation until stopping, an increasing moment of friction is produced between the gripping jaws and the inner brake drum. Another advantageous embodiment employs, instead of the tension springs, compression springs which for equal spring volume can supply greater spring work and are more accurately adjustable in their spring force. In this connection, the compression springs are provided at the points of attachment of two adjacent gripping levers and their deflection takes place opposite to the relative movement of said points of attachment. In this connection, straps can be guided from both sides through the free inner space of the compression springs which are connected to the spring end opposite their suspension on the gripping lever.

For a dependable braking action, it appears advisable to provide the gripping jaws on their frictional surfaces with a friction lining, preferably of sintered metal. The frictional surfaces of the gripping jaws can furthermore be divided into at least two partial areas located at the ends of the friction surface and between which there is a depression. In this way, a dependable application of the frictional surfaces is assured and an undesirable sliding-bearing effect avoided even during the course of the wear which is unavoidable. A further improvement can be obtained in the manner that the friction surface of the gripping jaws has sharp-edged indentations or grooves and is divided thereby into a plurality of small, rectangular, rhombic or circular individual friction surfaces. Finally, it appears advisable to associate with each gripping jaw on the reaction part a stop which limits the end position of the gripping jaw obtainable upon self-locking with the smallest permissible angle of friction for the pivoted gripping jaws. This measure prevents a jamming of the gripping jaws which could not then be opened again upon the shifting process.

The cooperation of the combined coupling elements in accordance with the invention will be described below.

The freewheel gripping locks always prevent any rearward rotation of the reaction parts of their gearing stage and therefore no gearing group can drop out below the speed of rotation of its stepped-down speed. The freewheel gripping locks transmit, without slippage, the supporting moments of the reaction parts to the outer transmission housing and corresponding torques to the secondary shafts. The friction brakes, namely in the form of a bank brake or of a multiple-disc friction brake, act in the arrangement in accordance with the invention only as freewheel locks, i.e., they prevent in stepped-down speed a rotation of the reaction parts in the direction of the driving shaft and in this way transmit the pushing moment of the vehicle or the driven masses to the engine.

For direct gear connection, the friction brake in the form of a band brake or of a multiple-plate friction clutch is released, and in such connection no moving apart of the reaction parts and no interruption of the driving force can occur. At the same time or slightly thereafter, the overriding clutch is connected, which thus takes over the moment of reaction from the freewheel gripping brake gradually, i.e., to the extent that it takes up the moment of rotation on its friction plates. As soon as the freewheel gripping brake has all load completely removed from it, the overriding clutch begins to carry the reaction part along with it, until it reaches the speed of rotation of the driving shaft of the corresponding gearing group. For the driven shaft, this shifting process means that first of all the secondary-shaft torque is decreased gradually to the value of the direct drive and that thereupon the speed of rotation of the driven shaft and of the driver shaft are in a ratio of 1:1 to each other. Upon shifting to the lowermost gear stage under load, the overriding clutch is released. The reaction part which at first rotates with drive speed is from now on delayed by its moment of reaction until it is braked by the freewheel gripping brake before pulling to a stop and then held fast upon stoppage. In the meantime, the brake band, which acts only as a freewheel lock, or the multi-disc friction brake proposed in its stead, has also been connected. The gear stage is firmly connected both in tractive-force or driving direction, and in the pushing-force or driven direction. It is a particular advantage of the invention that the connecting or disconnecting of the multiple-disc friction brake which acts as freewheel lock does not have any influence on the shifting of gears between freewheel gripping lock and overriding clutch. It is therefore not necessary precisely to synchronize the engagement and release of said multiple-disc friction brake with that of the overriding clutch.

The exact course of the shifting processes in the case of a planetary group gearing equipped with a shifting device in accordance with the invention does not permit any interruption of tractive force upon shifting to a higher gear; the moment of rotation and speed of rotation change gradually one after the other. The gearing operates as a true load shift gearing without engine clutch or hydraulic power transmission elements having to be used upon the shifting of gears.

Upon shifting to a lower gear, the lower gear engages only when the driving engine has reached the higher speed ratio corresponding to the speed of the secondary shaft. In this connection the lower gear cannot move away and the time of shifting-back corresponds exclusively to the time of acceleration of the driving engine. If the driving engine is accelerated during shifting to a lower gear by the giving of gas, no interruption on the tractive force occurs since the driving motor delays the rotating mass of the gearing group from the drive speed to standstill and thereby maintains a corresponding moment of rotation on the secondary side.

Embodiments of the invention are shown schematically below. In the drawings.

Figure 1:
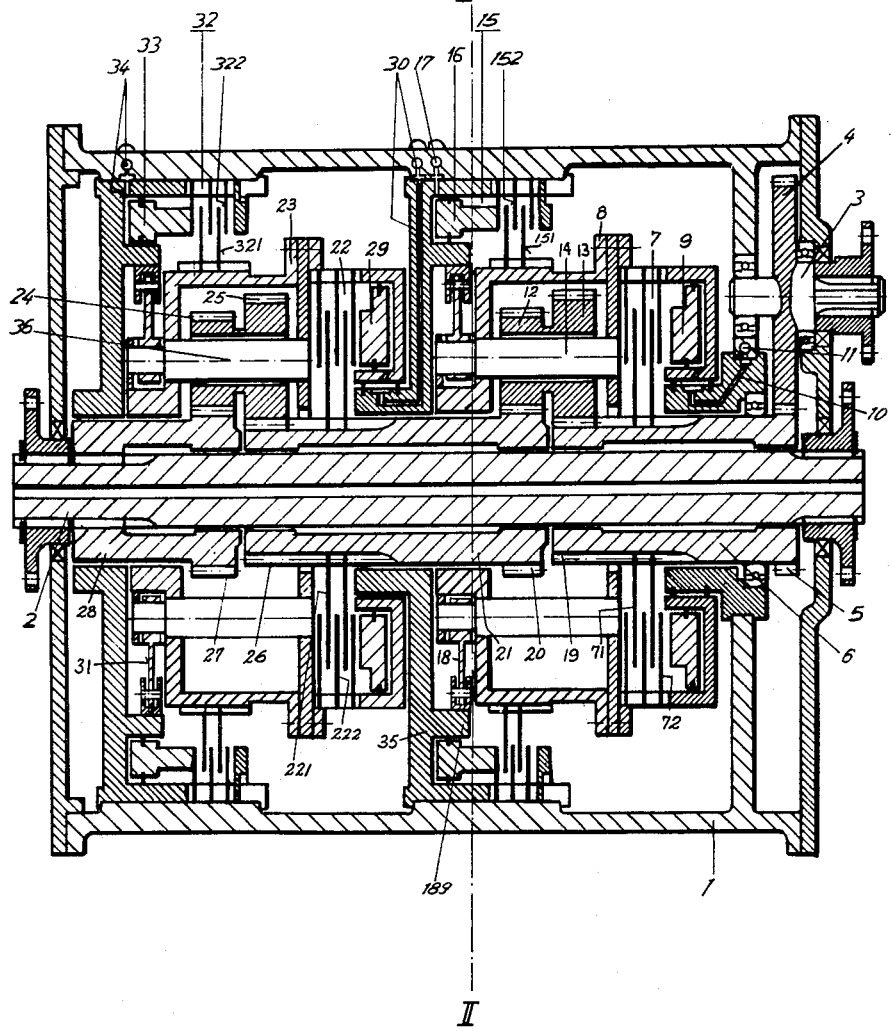
FIG. 1 is a longitudinal section through the gear sets of a planetary group gearing with load shifting device in accordance with the invention.

In the longitudinal section shown in FIG. 1, a secondary driven shaft 2 is rotatably supported in an outer gear housing 1. The drive is effected via an eccentric drive shaft 3 which is connected for rotation with a drive gear wheel 4. The gear wheel 4 is in engagement with a first gear rim 5 of a first hollow shaft 6 which is rotatably supported on the secondary shaft 2. A first overriding friction clutch 7 has its inner plates 71 fastened for rotation to the first hollow shaft 6 and its outer plates 72 to the first reaction part 8. On the first reaction part 8 there is provided a rotatable ring piston 9 which is displaceable by oil pressure, in which connection pressure oil can be forced by a feed pump (not shown) which is driven, for instance, by the drive shaft 3, into the space facing away from the outer plates 72 via a connecting line 10 and an outer connecting hole 11.

In the first reaction part 8, several, and preferably three, identical planet wheels are rotatably supported on shafts 14. They each consist of two gears 12, 13 rigidly connected with each other which form the first gearing group of a sun wheel 19 of the first hollow shaft 6 and a first sun wheel 20 of the second hollow shaft 21.

A friction brake 15 in the form of a plate clutch has its inner plates 151 fastened to the first reaction part 8 and its outer plates 152 to the outer gearing housing 1. The actuation of this friction brake 15 which is developed as plate clutch is effected by means of a non-rotatable ring piston 16, the compression chamber of which is fed via a pressure-oil line 17. Between parts of the outer gear housing 1 and the first reaction part 8, a first freewheel gripping lock 18 is provided. The gear 13 is in engagement with the sun wheel 19 of the first hollow shaft 6. The gear 12, on its part, meshes with the first sun wheel 20 of the second hollow shaft 21, which is also connected for rotation with inner plates 221 of a second overriding clutch 22. The outer plates 222 of the second overriding clutch 22 are connected for rotation with a second reaction part 23 and are axially displaceable in customary manner. In the second reaction part 23 several, and preferably three, identical planet wheels are also rotatably supported on shafts 36. They each consist of two gears 24, 25 rigidly connected with each other which form the second gearing group with a second sun wheel 26 of the second hollow shaft 21 and a first sun wheel 27 of the third hollow shaft 28. The gear 25 meshes with the second sun wheel 26 of the second hollow shaft 23 and the gear 24 meshes with the first sun wheel 27 of the third hollow shaft 28. The third hollow shaft 28 is connected for rotation with the secondary shaft 2 of the gearing.

For the actuation of the second overriding clutch 22, there is also provided a displaceable, rotatable ring piston 29, the compression chamber of which can be fed via a feed line 30 from a pressure-oil producer arranged outside the gearing. Between the outer gear housing 1 and the second reaction part 23, a second freewheel gripping brake 31 is arranged. The second reaction part 23 furthermore carries the inner plates 321 of a second friction brake 32 developed as a plate clutch, in which connection its outer plates 322 are arranged for rotation on the outer gear housing 1. The pressing together of the brake plates 321, 322 is effected upon the engagement of the friction brake 32 by means of a non-rotatable ring piston 33, the compression chamber of which can be filled with pressure oil via a feed line 34. The embodiment shown has a four-gear gearing in connection with which the individual actuating stages of the clutches and friction brakes can be noted from the following shifting diagram.

*Shifting diagram of the gearing*

| Gear | Friction brake II | Friction clutch for direct gear II | Friction brake I | Friction clutch for the direct gear I |
| --- | --- | --- | --- | --- |
| 1 | X | O | X | O |
| 2 | X | O | O | X |
| 3 | O | X | X | O |
| 4 | O | X | O | X |

X = connected (plate clutch engaged).
O = disconnected (plate clutch disengaged).

From the above table, it will be noted that by the alternate shifting of the two friction brakes and overriding clutches four gears are possible. Of course, the principle in accordance with the invention can be used also in gearings having a larger number of gear steps. The special structural advantage of the new embodiment lies in particular in the fact that the cooperating friction brakes and overriding clutches, due to their combination with a freewheel gripping brake are, in a certain sense, independent of each other and can be actuated without precise agreement between their shifting times. Because of the freewheel gripping brake, any possibility of the reaction parts moving away is prevented and the friction brakes are maintained in the driven or pushing-force direction of the stepped-down gear. While in the previously known constructions it was necessary to maintain precisely the reciprocal connection between the overriding friction clutch and friction brake, the costly structural parts necessary to accomplish this can be eliminated in the construction of the present invention.

Figure 2:
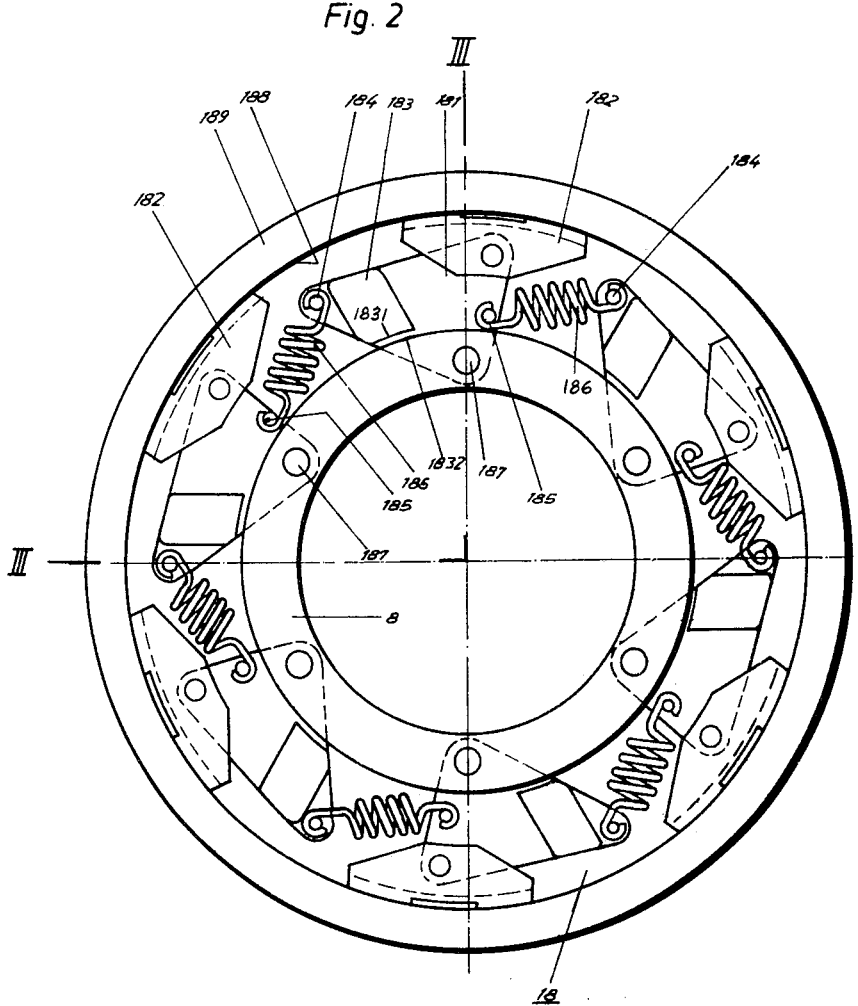
FIG. 2 is a cross-section through the freewheel gripping lock along the line II—II of FIG. 1.

In FIG. 2 there are shown the details of a novel freewheel gripping brake which forms part of the invention. In the disclosed arrangement there are provided six gripping levers 181, on each of which there is pivoted a gripping jaw 182. The gripping levers 181 have attached weights 183 in order to produce sufficient centrifugal forces. Furthermore, there are provided on the gripping levers 181, attachment bolts 184, 185 which serve as anchorages for tension springs 186. The attachment of these tension springs 186 is in this connection so related to the positions of the attachment bolts 184, 185 at different distances from the axis of rotation 187 of the gripping lever 181, that different lever arms with respect to the spring force are produced, whereby the gripping jaws 182 rest without the action of centrifugal forces against the inner surface 188 of an inner brake drum 189. The spring force is, in this connection, so established that the gripping jaws 182 rest against the inner brake drum 189 even before the corresponding reaction part comes to a stop and exert a strongly increasing frictional moment until the moment of stoppage. In this manner, jolt-less operation is obtained upon shifting gears. The movement of the gripping levers 181 is limited in the locking direction by stop surfaces 1831 on the added weights 183 which rest on a supporting ring 1832 when the gripping lever 181 reaches its end position in the engagement direction.

The inner brake drum 189 is connected to an intermediate partition wall 35 fastened to the outer gear housing 1 (note FIG. 1). The gripping levers 181 are swingably supported on the first reaction part 8. The second freewheel gripping brake 31 is also constructed in the manner above described.

Figure 3:
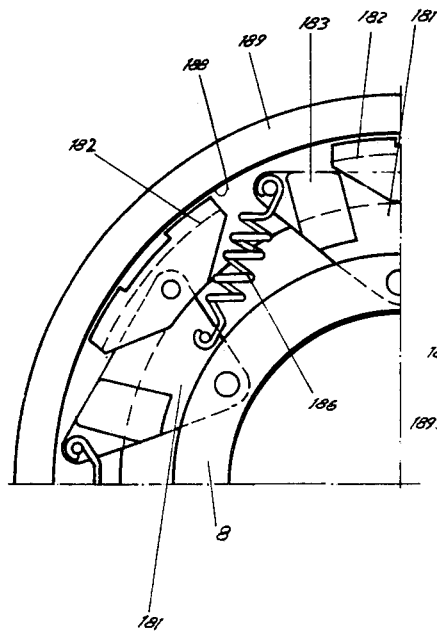
FIG. 3 is a partial view of the freewheel gripping lock along the line III—III of FIG. 2 in freewheeling position.

FIG. 3 shows a portion of the freewheel gripping lock of FIG. 2 in which the gripping jaws 182 are withdrawn from their position on the inner surface 188 of the inner brake drum 189 under the action of the centrifugal forces caused by the rotation of the first reaction part 8. The tension springs 186 are in this connection further stretched than in the operating position shown in FIG. 2.

Figure 4:
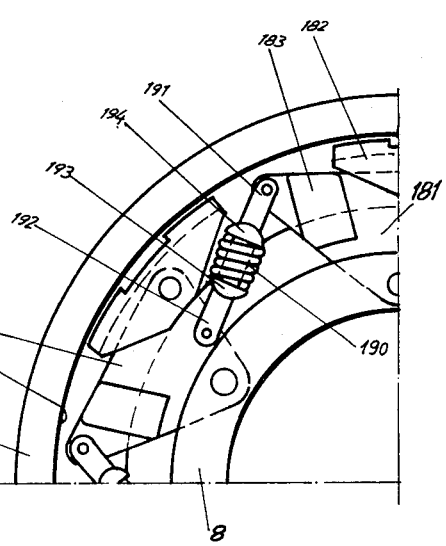
FIG. 4 is a partial view of a freewheel gripping lock in accordance with the invention with compression springs.

In the embodiment shown in FIG. 4, the tension springs 186 have been replaced by compression springs 190. This necessitates a change in the spring suspension. For this purpose, there are used two tie straps 191, 192 which pass through the free inner space of the compression springs 190, extension members 193, 194 of said straps grasping the spring end of the compression spring 190 opposite the point of suspension thereof on the gripping lever 181. In this way, the deformation of the spring is effected in the desired manner opposite to the relative movement of its suspension points.

Figure 5:
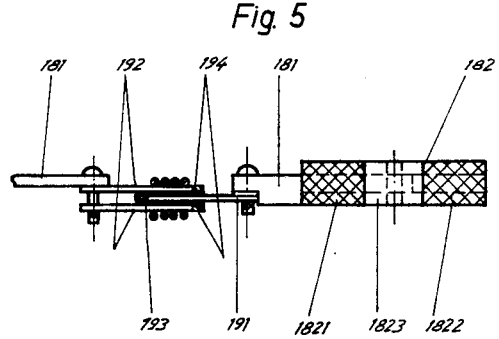
FIG. 5 is a top view of a brake jaw in a freewheeling gripping lock as shown in FIG. 4 with stretched spring rod.

Additional details of the embodiment in accordance with FIG. 4 can be noted from the top view in FIG. 5 of the stretch spring rods and it will be noted particularly clearly that the gripping jaws 182 have on their engaging surface two frictional surfaces 1821, 1822 separated by a depression 1823, the said surfaces being subdivided by sharp-edged ridges into a plurality of individual friction surfaces. The individual parts in FIG. 5 to which reference has thus been made in detail, correspond to those of FIG. 4.

I claim:

1. A load shifting device capable of effecting a change of gearing on an increase of speed without interruption in the tractive force and a continuous change in torque at the driven shaft, comprising a plurality of planetary group transmissions connected in aligned series to operate as a reduction transmission with increase of torque, and each of which is shifted into stepdown speed stages by frictionally connecting a rotatable reaction part thereof to the transmission housing, each of said planetary transmission groups including a drive shaft for such group, a reaction part mounted for rotational movement about the rotational axis of said drive shaft, said reaction part including a planetary group gearing continuously connected in driven relation to said drive shaft, an overriding friction clutch between said drive shaft and said reaction part, means for actuating said friction clutch to frictionally engage and disengage said reaction part to said drive shaft, a friction brake between said reaction part and the transmission housing, means operative to disengage said friction brake during the direct drive gear connection of said reaction part with said drive shaft, and to engage said friction brake to frictionally connect said reaction part to the transmission housing after said friction clutch has been actuated to disconnect said reaction part from its driven relation with said drive shaft and without disconnecting said group gearing from its driven relation to said drive shaft, and a free wheel gripping brake between said reaction part and the transmission housing for locking said reaction part to the transmission housing when said friction brake after having been applied has substantially reduced the rotative movement of said reaction part, said free wheel gripping brake comprising means for frictionally engaging a braking surface on said transmission housing, means for resiliently biasing said frictional means into frictional engagement with said braking surface, and means for disengaging said frictional means on increase of centrifugal force above the pressure of said resilient means.

2. A load shifting device such as is defined in claim 1, in which said overriding friction clutch is a multi-disc friction clutch having at least one clutch disc secured to said drive shaft and at least one clutch disc secured to said reaction part.

3. A load shifting device such as is defined in claim 1, in which said friction brake is a multi-disc friction brake having at least one brake disc secured to said reaction part and at least one brake disc secured to the transmission housing.

4. A load shifting device capable of effecting a change of gearing on an increase of speed without interruption in the tractive force and with a continuous change in torque at the driven shaft, comprising a plurality of planetary group transmissions connected in aligned series to operate as a reduction transmission with increase of torque, and each of which is shifted into stepdown speed stages by frictionally connecting a rotatable reaction part thereof to the transmission housing, each of said planetary transmission groups including a drive shaft for such group, a reaction part mounted for rotational movement about the rotational axis of said drive shaft, said reaction part including a planetary group gearing continuously connected in driven relation to said drive shaft, an overriding friction clutch between said drive shaft and said reaction part, means for actuating said friction clutch to frictionally engage and disengage said reaction part to said drive shaft, a friction brake between said reaction part and the transmission housing, means for actuating said friction brake to frictionally engage and disengage said reaction part to the transmission housing, and a free wheel gripping brake between said reaction part and the transmission housing for locking said reaction part to the transmission housing when said friction brake after having been applied has substantially reduced the rotative movement of said reaction part, said free wheel gripping brake being constituted of a gripping jaw ratchet lock mounted on said reaction part and frictionally engageable and disengageable with a fixed braking surface provided on the transmission housing dependent on the speed of rotation of said reaction part.

5. A load shifting device such as defined in claim 4, in which said ratchet lock is composed of a plurality of gripping levers distributed about the axis of said drive shaft on the periphery of said rotatable reaction part, means for swingably connecting said levers to said reaction part, gripping jaws mounted on said levers and engageable with said fixed braking surface, and means tending to cause said gripping levers to swing said gripping jaws into engagement with said fixed braking surface and yieldable under the centrifugal force created by the rotation of said reaction part to withdraw said levers and thereby remove said gripping jaws from their gripping relation with said braking surface.

6. A load shifting device such as defined in claim 5, in which said yieldable means comprises spring means connected to said gripping levers and normally biasing said gripping levers to swing said gripping jaws into engagement with said fixed braking surface, and weights located on each of said gripping levers to produce centrifugal forces sufficient to overcome the normal tension of said spring means.

7. A load shifting device such as defined in claim 6, in which said weights are located on said gripping levers to cooperate with said reaction part to limit the swinging movements of said gripping levers towards said fixed braking surface.

8. A load shifting device such as defined in claim 5, in which each of said gripping jaws is provided on its braking surface with a friction lining.

9. A load shifting device such as defined in claim 5, in which the braking surface of each gripping jaw is composed of two spaced braking surface portions between which there is provided a depression.

10. A load shifting device such as defined in claim 5, in which said gripping jaws are pivotally mounted on said levers, and including cooperating stop means between each gripping lever and said reaction part for limiting the range of swing of said lever towards said fixed braking surface to provide for a given minimum frictional engagement of its associated pivotal gripping jaw with said fixed braking surface.

11. A load shifting device such as defined in claim 5, in which said yieldable means comprises a plurality of spring means linking said gripping levers together so that two of such spring means are connected to each gripping lever, the points of connection of such two spring means with each lever forming different active lever lengths from the swinging axis of such lever, and the spring force of such two spring means being so selected that during the period in which said gripping jaws engage, said fixed braking surface until said reaction part stops, an increasing moment of friction between said gripping jaws and said fixed braking surface is produced.

12. A load shifting device such as defined in claim 11, in which each of said spring means comprises a coiled spring extending between the points of attachment of said spring means to adjacent gripping levers, and means connecting said coiled spring to said points of attachment so that deformation of the spring is effected in a direction opposite to the relative movement of said points of attachment in the swinging movements of said gripping levers.

13. A load shifting device such as defined in claim 12, in which said spring connecting means in each of said spring means comprises tie straps connected by one of their ends to said adjacent gripping levers at said points of attachment and extending in opposite directions through the associated coiled spring, and means connecting the other end of each of said tie straps to that end of said coiled spring which is opposite the point of attachment of such tie strap to an adjacent gripping lever.

14. A load shifting device comprising a plurality of planetary group transmissions connected in aligned series to operate as a reduction transmission with increase of torque, and each of which is shifted into stepdown speed stages by fixing a rotatable reaction part thereof with respect to the transmission housing, each of said planetary transmission groups including a drive shaft for such group, a reaction part mounted for rotational movement about the rotational axis of said shaft and having planetary group gearing continuously connected in driven relation to said drive shaft, a multi-plate friction clutch having a clutch plate part secured to said drive shaft and having a clutch plate part secured to said reaction part, means for actuating said friction clutch to frictionally connect said reaction part to said drive shaft for direct drive gear connection and to disconnect said reaction part from the driving action of said drive shaft on increase of torque on the latter, a multi-plate friction brake having a brake plate part secured to said reaction part and a brake plate part secured to the transmission housing, means for releasing said friction brake during direct drive gear connection and for applying said friction brake when said reaction part is disconnected from its driven relation with said drive shaft, and a free wheel gripping brake mounted on said reaction part for locking the latter to the transmission housing when said friction brake after having been applied has substantially reduced the rotative movement of said reaction part, said free wheel gripping brake comprising a plurality of clamping levers arranged around the axis of said drive shaft and pivotally connected to said reaction part, clamping jaws pivotally mounted on said levers and engageable with a fixed annular braking surface provided on the transmission housing, and spring means linking said clamping levers and so arranged therebetween that the tension applied thereby to press said clamping jaws against said annular braking surface is overcome by the centrifugal force which is created by the rotation of said reaction part and which is operable to withdraw said clamping jaws from such braking surface against the tension of said spring means.

References Cited by the Examiner

UNITED STATES PATENTS

| | | | |
|---|---|---|---|
| 799,805 | 9/1905 | Simonds | 74—789 |
| 813,461 | 2/1906 | Stacks | 74—789 X |
| 2,038,799 | 4/1936 | Masson | 74—770 |
| 2,101,233 | 12/1937 | Bancroft | 74—770 |
| 2,349,410 | 5/1944 | De Normanville | 74—767 |
| 2,976,959 | 3/1961 | Husted | 188—82.7 |
| 3,003,593 | 10/1961 | Luenberger | 188—82.84 |
| 3,021,925 | 2/1962 | Osborne | 188—82.8 |

DON A. WAITE, *Primary Examiner.*